United States Patent [19]
Goldman et al.

[11] 4,318,945
[45] Mar. 9, 1982

[54] UNDERWATER AQUARIUM DECORATION ASSEMBLY

[75] Inventors: Jerome N. Goldman, New York; Marvin A. Goldman, Great Neck; Gerald Phillips, Oyster Bay, all of N.Y.

[73] Assignee: Penn-Plax Plastics, Inc., Garden City, N.Y.

[21] Appl. No.: 115,920

[22] Filed: Jan. 28, 1980

[51] Int. Cl.³ .......................... A01K 64/00; B44F 9/04
[52] U.S. Cl. ...................... 428/15; D30/12; 46/28
[58] Field of Search ............... 46/25, 28; 428/13, 15; 119/5; D23/13; D30/12

[56] References Cited
U.S. PATENT DOCUMENTS
2,912,792 11/1959 Venable ........................ 428/15 X
2,972,833 2/1961 Grutta .......................... 428/28 X
3,744,454 7/1973 Willinger et al. ............... 428/13 X
4,129,960 12/1978 Gale ............................ 46/25

FOREIGN PATENT DOCUMENTS
1936050 3/1976 Fed. Rep. of Germany .

Primary Examiner—Henry F. Epstein
Attorney, Agent, or Firm—Mandeville and Schweitzer

[57] ABSTRACT

A rock-like decorative assembly including a plurality of irregularly shaped shells each having side walls and a top wall, the outer surfaces of all said shells being mottled, at least one, integral first connector means formed on the inside of the top wall of each of said shells, one integral second connector means formed on the outside of the top wall of said shells, said first and second connector means being mateable to connect juxtaposed shells into a rock-like formation.

6 Claims, 3 Drawing Figures

UNDERWATER AQUARIUM DECORATION ASSEMBLY

BACKGROUND AND SUMMARY OF THE INVENTION

Aquarium decoration has taken the form of natural ornamentation including live plants, actual gravel, stone, sand, and the like. Over the years artificial ornaments of various shapes have supplemented or replaced natural ornamentation. Included in such artificial ornamentation have been plastic flowers, plastic sunken ships, treasure chests, and the like. The present invention is directed to modular decorative units which may be selectively assembled to provide a variety of rock-like decorative formations for the floor of an aquarium.

In accordance with the invention, the new modular decorative units, all of which have a non-buoyant specific gravity, i.e. more than 1.0, are interconnectable by a universal pin and socket arrangement to form caves, ledges, or any other desired "rock" formation.

To provide maximum authenticity in appearance to that of natural rock, the new units are fabricated from a non-homogeneous mixture of thermoplastic and talc. Thus the surfaces of the units are inherently mottled or otherwise provided with a variegated pattern, they generally resemble actual rock. Of course, for enhanced decorative effects, the plastic units may be selectively colored.

For a more complete understanding of the invention and better appreciation of its advantages, reference should be made to the following detailed description thereof and to the accompanying drawing.

DETAILED DESCRIPTION OF THE INVENTION

Figure 1:
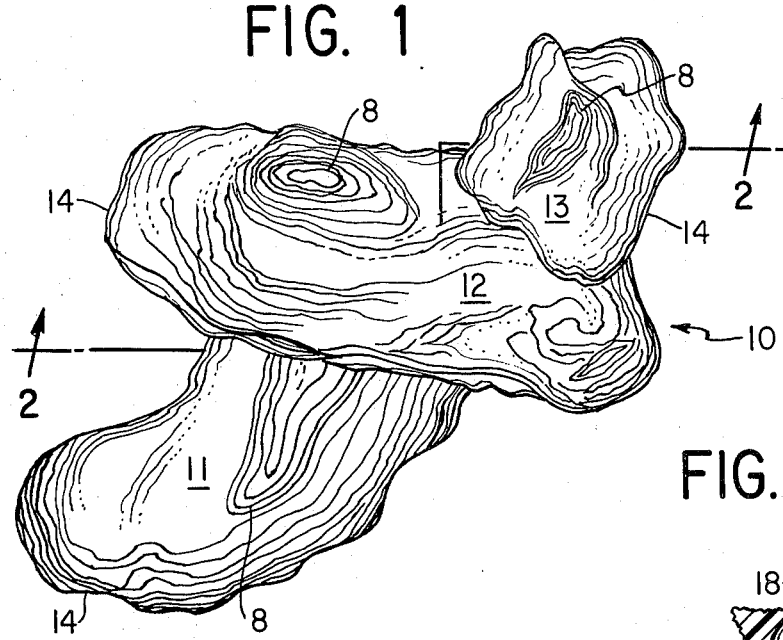
FIG. 1 is a perspective view of the underwater aquarium decoration assembly of the invention.
Figure 2:
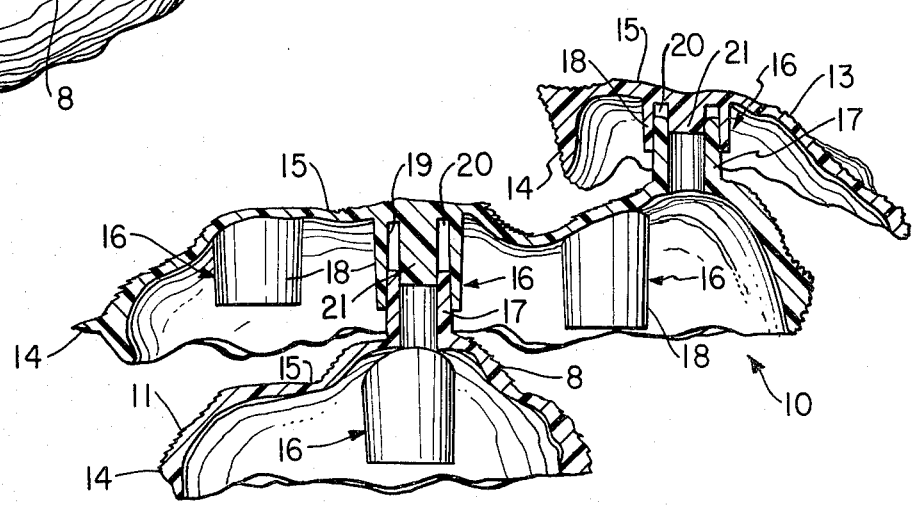
FIG. 2 is a cross-sectional view showing details of construction taken along line 2—2 of FIG. 1.
Figure 3:
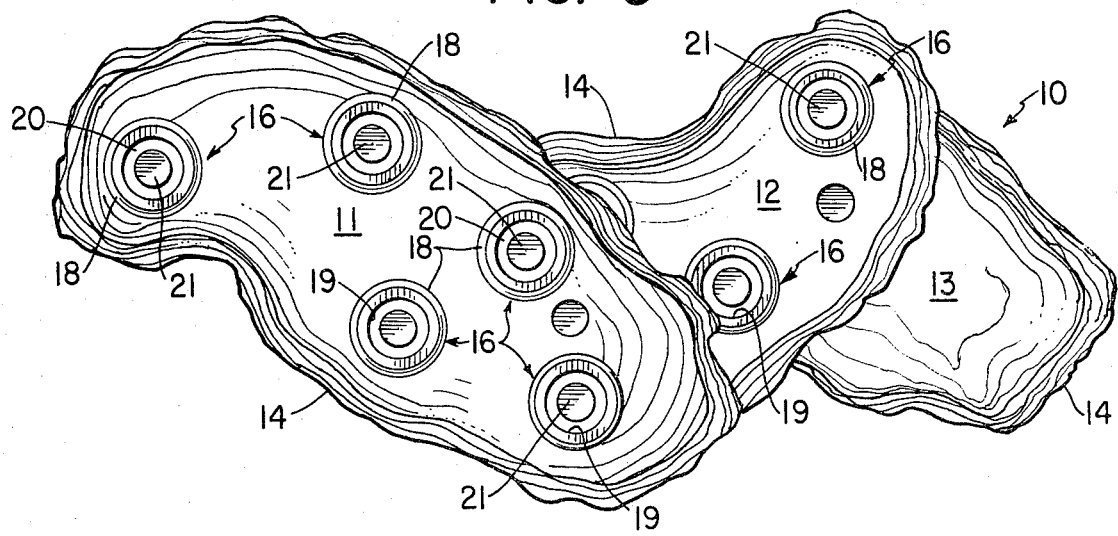
FIG. 3 is a bottom plan view of the assembly of the invention.

Referring now to FIG. 1, the aquarium decoration assembly of the present invention generally includes a plurality of shell-like members 11, 12, and 13 interconnected to form a simulated rock formation 10. The outer surfaces of the shells, 11, 12, and 13 are irregularly shaped and are modeled to provide random, variegated rock-like patterns 8 thereon.

The individual units 11, 12 and 13 may be selectively attached on to the other in selective sequences and in any numbers (a set of assembly members may have any number of individual units as should be understood) to form rock-like caves, ledges and other attractive decorative formations for use in aquariums or in other similar applications.

Each of the decorative shells 11, 12 and 13 includes circumscribing side walls 14 and depending from the inside of each of the top walls 15 are one or more female socket members 16 which are adapted to receive upwardly projecting male locking pin members 17 formed on the top walls of some but not all of the shell units, many formed on the top walls of the units 11 and 12. The socket and pin connectors provide a simple and reliable means of fastening shell units together one on top of another in any selected relationship of one to the other as will be understood. More specifically, the sockets 16 are formed by outer hollow cylinders 18 having tapered mouth portions 19 to facilitate insertion of the locking pins 17 into an annular socket 20 defined between the hollow cylinder 18 and a concentric guide 21. The male locking pin 17 is merely a projecting hollow cylinder whose dimensions are that of the annular socket 20. Thus, the pin member 17 may be inserted in the socket member 16 to connect juxtaposed shell members; the juxtaposed shell members may then be rotated one with respect to the other into a selected portion. As shown, the side walls 14 of each of the shells extend beneath the lower ends of the socket member 16 thereby obscuring them from view in the final assembly.

In accordance with the invention, the shell units 11, 12, 13 are manufactured from a mixture of moldable thermoplastic material and talc having a specific gravity greater than 1.0 so that the individual units will not require special ballasting. Importantly, the mixture of thermoplastic and talc is non-homogeneous so that the irregular modeled surface appearance of the units is enhanced so that the last portions of the variegated patterns 8 are formed by the talc portions of the mixture and especially avantageous material for forming the individual units 11, 12, 13 is comprised of 60% polypropylene and 40% talc.

It is to be understood that the specific illustrated form of the invention is intended to be representative only since certain changes may be made therein without departing from the clear teachings of the disclosure. Accordingly, reference should be made to the following claims in determining the full and broad scope of the invention.

We claim:

1. A rock like decorative assembly including
   (a) a plurality of irregularly shaped shells of at least one form, each having side walls and a top wall,
   (b) the outer surfaces of all said shells being mottled,
   (c) at least one integral first connector means formed on the inside of the top wall of each of said shells,
   (d) one integral second connector means formed on the outside of the top wall of at least one of said shells,
   (e) said first and second connector means being mateable to removably connect vertically juxtaposed shells into a rock-like formation,
   (f) said formation having varying appearances depending on the choice of shell form.

2. A rock-like decorative assembly in accordance with claim 1 in which each of said shells is thermoformed from a material having a specific gravity greater than 1.0.

3. A rock-like decorative assembly in accordance with claim 2 in which said material comprises a non-homogeneous mixture of approximately 60% thermoplastic and 40% talc.

4. A rock-like decorative assembly in accordance with claim 3 in which said thermoplastic is polypropylene.

5. A rock-like decorative assembly in accordance with claim 1 in which said first connector means comprises a projecting hollow cylinder having an inner concentric cylindrical guide, said guide and said cylinder defining an annular socket of predetermined diameter.

6. A rock-like decorative assembly in accordance with claim 5 in which said second connector means comprises a hollow cylindrical pin of diameter substantially that of said socket, whereby said socket and said pin are telescopically engageable to connect said shells and to accommodate the attachment of one shell with respect to the other at any predetermined angle.

* * * * *